A. C. RICHARDS.
Type-Setting Machine.

No. 212,504. Patented Feb. 18, 1879.

A. C. RICHARDS.
Type-Setting Machine.

No. 212,504. Patented Feb. 18, 1879.

Witnesses
Otto Shipland
W. C. Hauff

Inventor
Augustus C. Richards
by Van Santvoord & Hauff
his attys.

A. C. RICHARDS.
Type-Setting Machine.

No. 212,504. Patented Feb. 18, 1879.

Witnesses
Otto Hufeland
H. C. Hauff

Inventor
Augustus C. Richards
by Van Santvoord & Hauff
his attys

A. C. RICHARDS.
Type-Setting Machine.

No. 212,504. Patented Feb. 18, 1879.

UNITED STATES PATENT OFFICE.

AUGUSTUS C. RICHARDS, OF IRVINGTON, NEW YORK.

IMPROVEMENT IN TYPE-SETTING MACHINES.

Specification forming part of Letters Patent No. 212,504, dated February 18, 1879; application filed July 5, 1878.

*To all whom it may concern:*

Be it known that I, AUGUSTUS C. RICHARDS, of Irvington, Westchester county, and State of New York, have invented a new and useful Improvement in Type-Setting Machines, which improvement is fully set forth in the following specification, reference being had to the accompanying drawings, in which—

Similar letters indicate corresponding parts.

This invention relates to certain improvements on that class of type-setting machines for which Letters Patent have been granted to me June 1, 1875, No. 164,037, and in which an endless carrying-apron is used, in combination with converging belts which move at a speed different from that of the carrying-apron, and with a series of type-cases, from which the desired types are discharged successively by suitable mechanism in such a manner that by the combined action of the carrying-apron and of the converging belts the types are deposited in the proper position in a channel provided for their reception.

The improvements which constitute the subject-matter of my present invention relate to the manner of supporting the converging belts; also, to the mechanism for transferring the types from the carrying-apron into the receiving type-channel; also, to the construction of the receiving type-channel and receiving type-cases; also, to mechanism for discharging the types from the supply type-cases, and to the manner of mounting the support of these type-cases and of connecting the same to the main frame.

Figure 2:
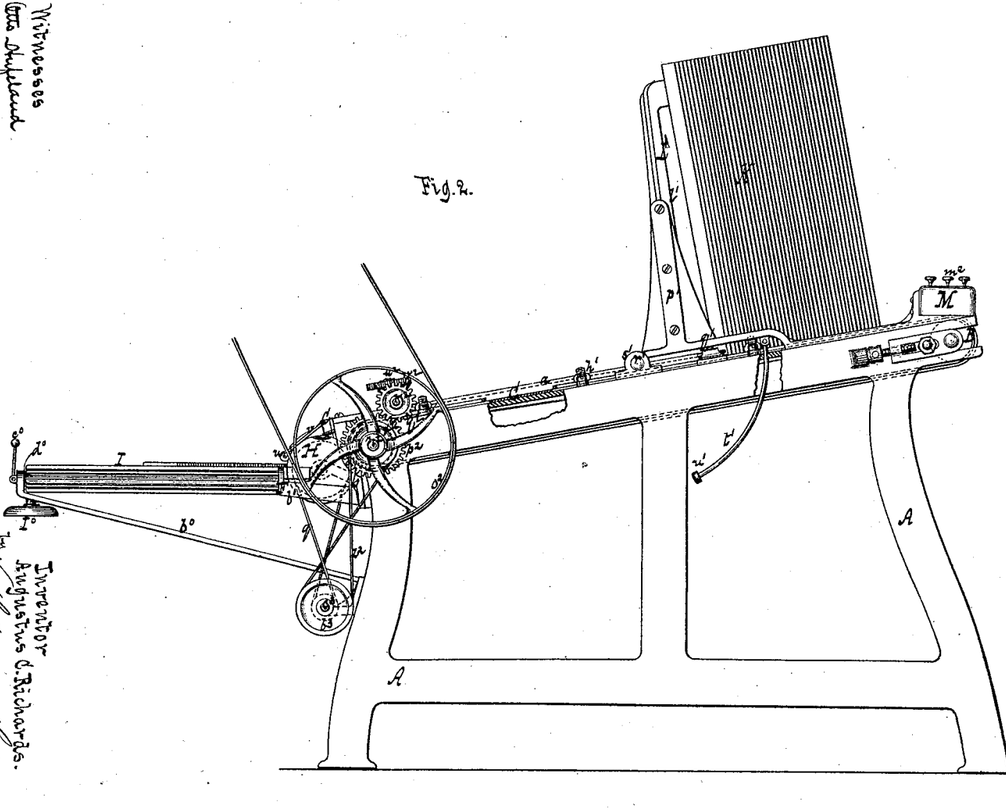
Fig. 2 is a side view.

In the drawings, the letter A designates a frame which forms the bearings for two rollers, B B, round which extends an endless apron, C. This endless apron is preferably made of india-rubber cloth, and the frame and apron are, by preference, placed in an inclined position, as shown in Fig. 2.

With said apron are combined two belts, D D', which run over pulleys E E', situated above the apron and close to its surface, so that the edges of the belts move in close proximity to the surface of the apron. In order to prevent the belts from rubbing against and from cutting into the apron, however, the pulleys E E' are provided with tapering flanges $a^2$ on their under sides, and the lower edges of the belts D D' are beveled off, (see Fig. 10,) so that they are enabled to run close enough to the apron to prevent any type from passing beneath them, while they are effectually prevented from coming in actual contact with said apron.

In order to prevent the inner strands of the belts from canting over, flanged rails $a$ are applied, which catch over the upper edges of said belts. The belts D D' are kept at the desired tension by means of tightening-rollers $a^3$, which are mounted in the ends of arms $a^4$, secured to the rails $a$ by screws $a^5$, and which bear on the outer strands of said belts from opposite sides. By adjusting the arms $a^4$ the tension of the belts can be increased or diminished to suit. The tightening-rollers $a^3$ are provided at their bottom surfaces with tapering flanges, the same as the pulleys E E', for the purpose of preventing the belts D D' from rubbing against the apron C. Instead of the belts D D', two stationary converging guides may be used, which are made of glass or other smooth material; but the belts are preferable.

The pulleys E E' are so arranged that the belts D D' converge toward the receiving type-channel F, situated at the lower part of the apron, and said belts are geared together with the carrying-apron C, so that they move with a different velocity. If a type is dropped upon the upper part of the carrying-apron it is carried down until it comes in contact with one of the converging belts, and by the action of this belt the type is turned so that it lies close against the inner surface of said belt, and so that it moves down toward the receiving type-channel in the required position.

Figure 1:
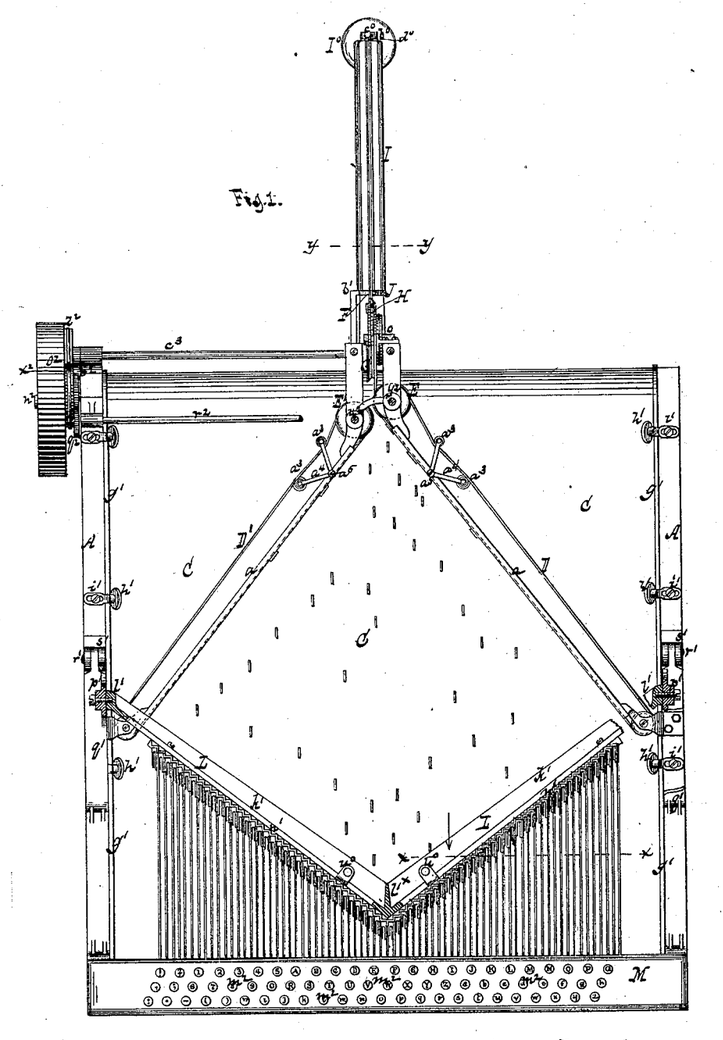
Figure 1 represents a plan or top view.
Figures 3, 4:
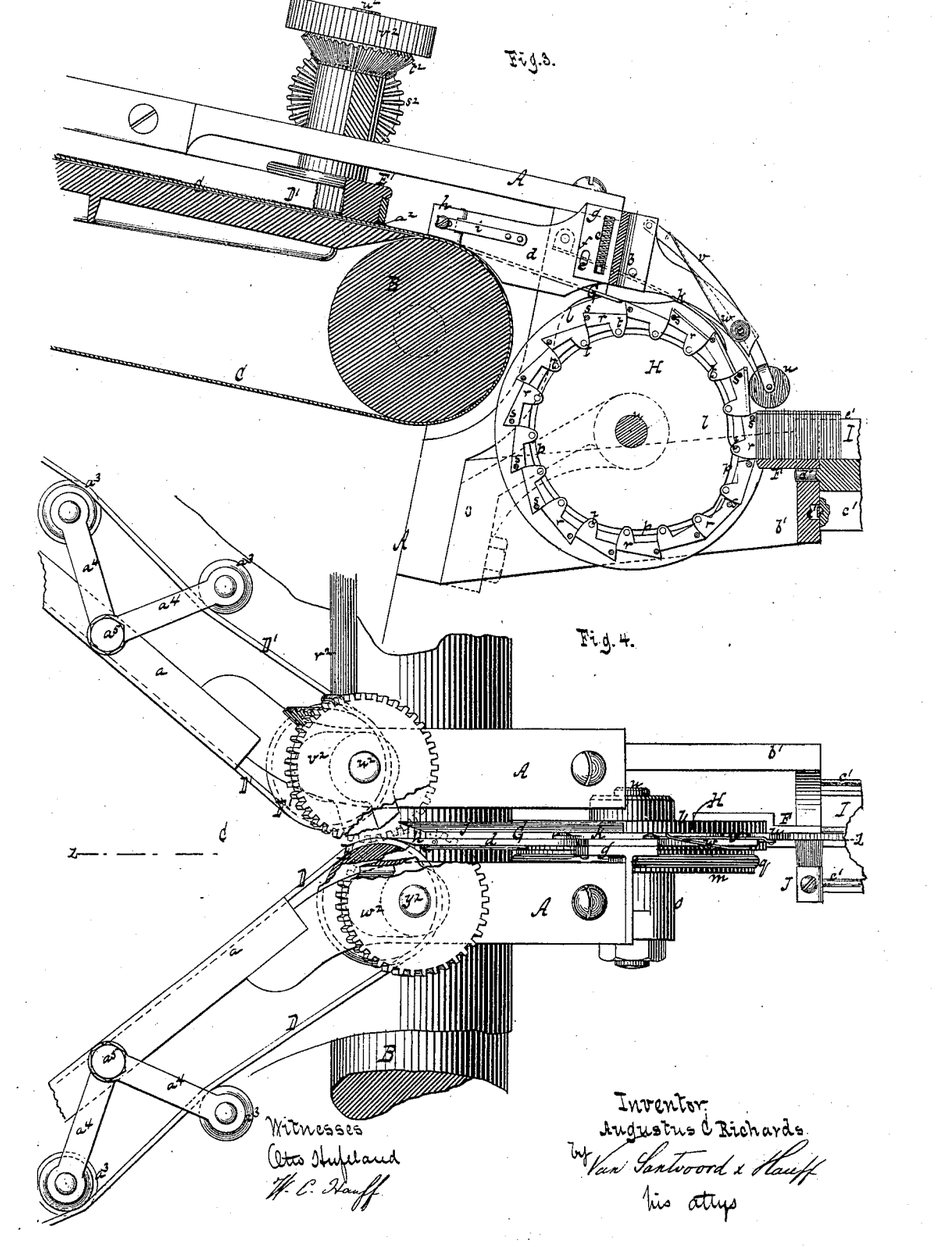
Fig. 3 is a longitudinal vertical section of the mechanism for transferring the types into the receiving-channel on a larger scale than the previous figures, the plane of section being indicated by the line $z\,z$, Fig. 4.
Fig. 4 is a plan or top view of the same.

By referring to Figs. 1 and 4 it will be seen that the belt D extends somewhat farther down than the belt D', and on reaching the lower end of the carrying-apron each type finally strikes the belt D, and is conducted by this belt into a chute, G, which leads down to the conveyer H. Said chute is secured to the main frame A by a pivot, $b$, and it is depressed upon the carrying-apron by means of a spring, $c$. From one of the side plates $d$ of the chute extends a pin, $e$, through slot $f$ in a bracket, $g$, which is firmly secured to the frame A, so that in case a type should accidentally get beneath the chute, said chute can rise, and injury to the mechanism is prevented. The upward motion of the chute is limited by the pin $e$ and slot $f$.

To the inner end of the side plate $d$ is pivoted a section, $h$, the inner sharp edge of which is held in close contact with the belt D by means of a spring, $i$. (See Figs. 3 and 4.) The section $h$ is made yielding, so that in case a type should be forced between the same and the belt D such type can escape without causing any disturbance. The side plate $j$ of the chute is rigid, and its flaring sharp-pointed inner edge bears down closely upon the carrying-apron C.

To the side plate $d$ of the chute is pivoted a finger, $k$, which serves to retain the types on the conveyer H. This conveyer consists of two disks, $l\ m$. The disk $l$ is firmly mounted on a pin, $n$, which is secured in an arm, $o$, extending from the frame A, and in the inner surface of said disk is a cam-groove, $p$. (Best seen in Fig. 3.) The disk $m$ of the conveyer turns loosely on the pin $n$, motion being imparted to it by a belt, $q$, which extends over it, (see Figs. 2 and 4,) and to the inner surface of said disk are secured a series of carriers, $r$, by means of pivots $s$. (See Fig. 3.) Each of these carriers is provided with a pin, $t$, which engages with the cam-groove $p$ in the stationary disk $l$. As the conveyer revolves the carriers sweep past the outer edge of the chute G, and the types which slide down through said chute are received by the successive carriers and delivered into the receiving type-channel F.

By referring to Fig. 3 it will be seen that the carriers are situated close together, so that the inner edge of each carrier practically forms the bottom for the succeeding carrier, and each type, on being deposited upon one of the carriers, abuts with its foot against the inner edge of the preceding carrier. The types are retained on the carriers by the finger $k$, which bears on the same by its inherent gravity and by the action of a roller, $u$, which is mounted in the end of an arm, $v$, that is pivoted to the side plate $d$ of the chute G, and depressed by the action of a weak spring, $w$. This roller is situated over the mouth of the receiving type-channel F, and at the moment one of the carriers comes directly opposite to this mouth its loose end is forced outward by the cam-groove $p$, and the type resting thereon is forced into the type-channel. This type-channel is formed in the outer end of a bracket, $b^1$, secured to the main frame A, and with it is combined a carriage, O, which contains a series of type-cases, P, to receive the types from the type-channel F. This carriage is provided with wheels $a^4$, which rest on rails $b^4$, running in a direction transverse to the receiving type-channel, and supported by a frame, Q, Figs. 13, 14, and 15. The box of said carriage is open on its end facing the receiving type-channel, and the receiving type-cases P are formed either in one piece fitting nicely between the sides of the box and abutting against its outer end, or they may be made separate and placed side by side into said box.

Figure 14:
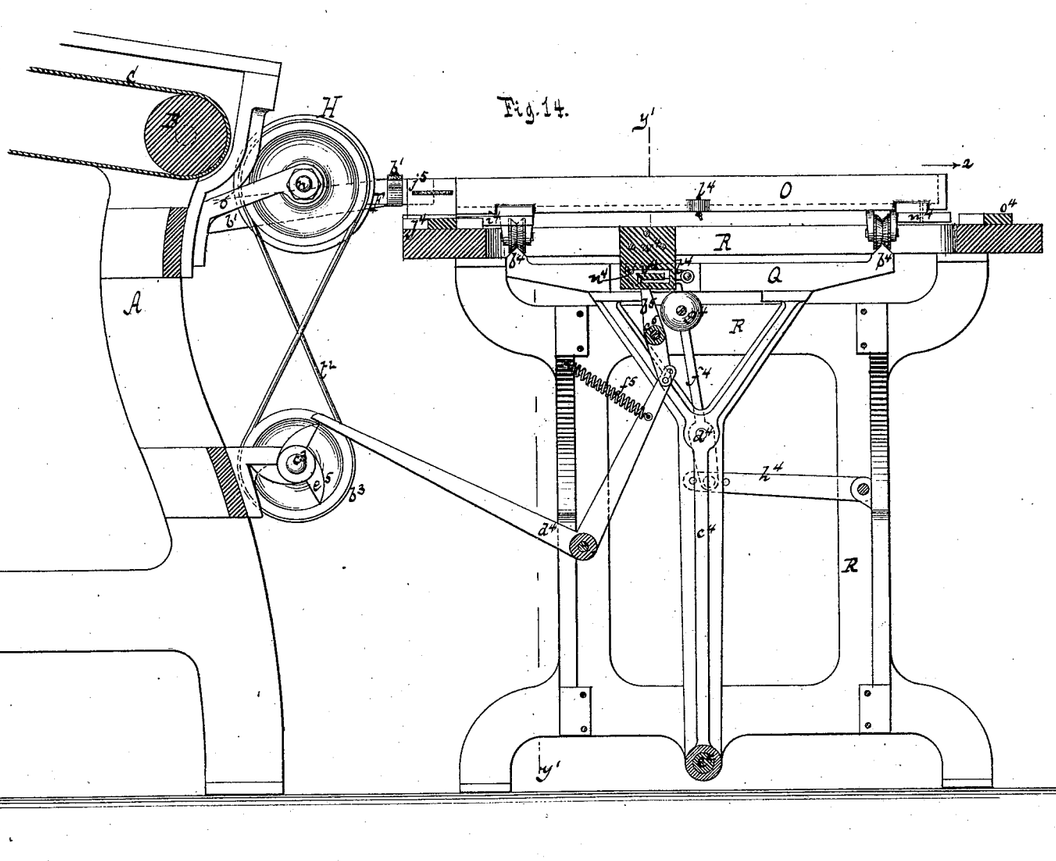
Fig. 14 is a longitudinal section of the same in the plane $x^1\,x^1$, Figs. 13 and 15.
Figures 15, 16:
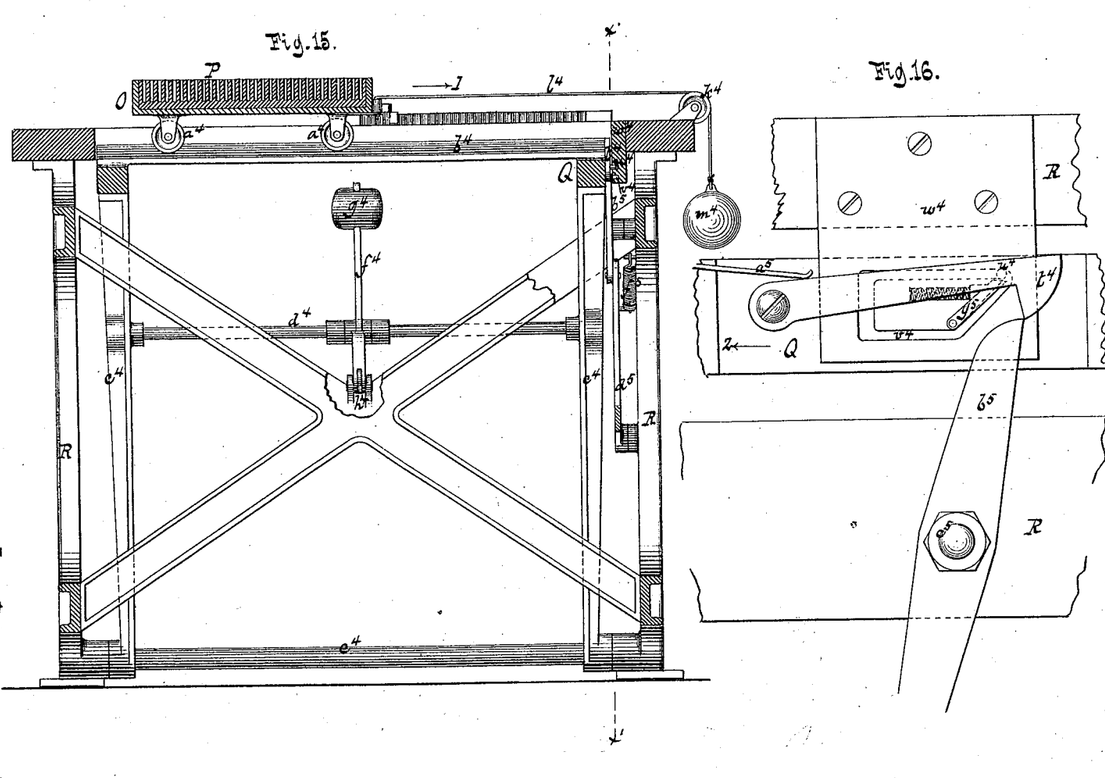
Fig. 15 is a transverse section in the plane $y^1\,y^1$, Figs. 13 and 14.
Figs. 16 to 20, inclusive, are details which will be referred to as the description progresses.

The frame Q, which supports the rails $b^4$, is composed of arms $c^4$, which are connected by a traverse, $d^4$, and swing on a rod, $e^4$, secured in the sides of the stationary frame R near its bottom, Figs. 14 and 15.

Figure 13:
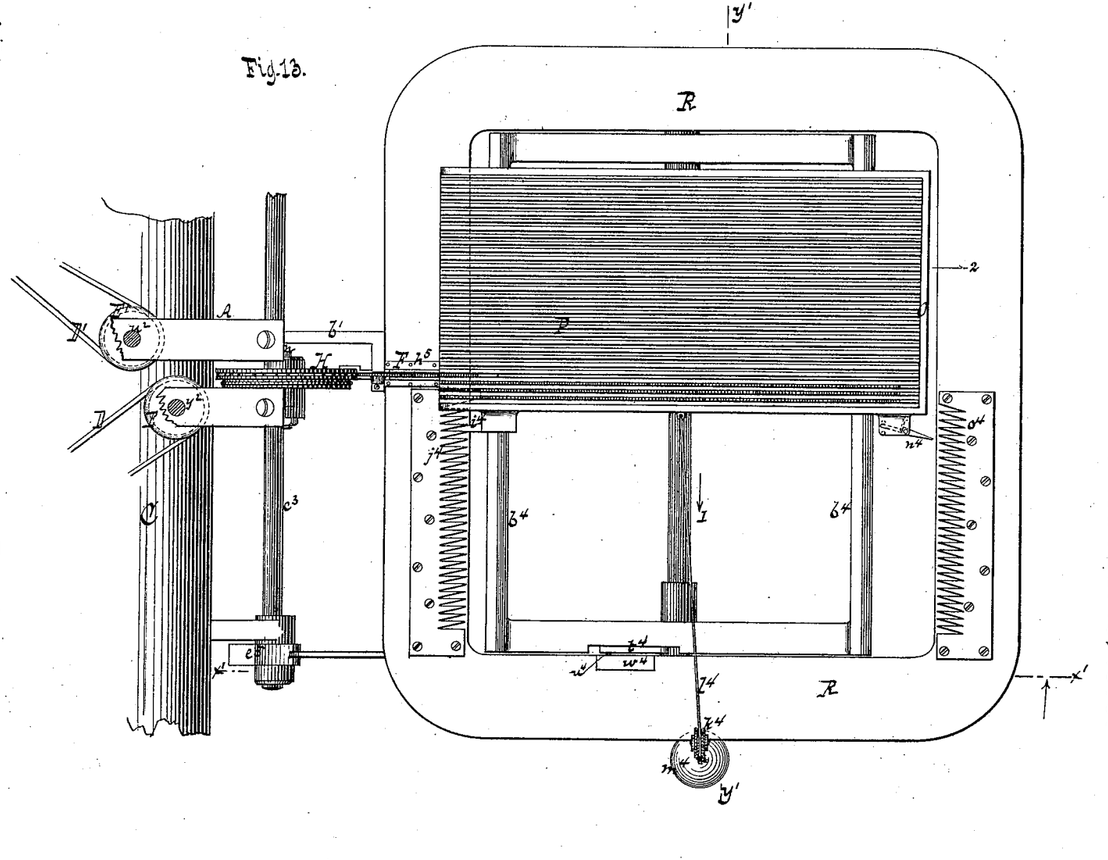
Fig. 13 represents a plan or top view of the receiving type-cases and the mechanism for adjusting the same automatically in regard to the receiving-type-channel.

On the traverse $d^4$ is mounted an arm, $f^4$, which swings freely thereon, and to the upper end of which is secured a weight, $g^4$, while its bottom end is pivoted to a link, $h^4$, Fig. 14, in such a position that said weight has a tendency to keep the carriage against the receiving type-channel, and to throw a stop, $i^4$, Fig. 13, which is secured to the side of the carriage O, in gear with a rack, $j^4$. The distance between the teeth of this rack corresponds with the distance between the receiving type-cases P, and they are so placed that whenever the stop $i^4$ is in gear with said teeth one of the receiving type-cases is in line with the receiving type-channel F.

On one side of the stationary frame R is a roller, $k^4$, over which runs a cord, $l^4$, one end of which is secured to the carriage O, while from its other end is suspended a weight, $m^4$, which draws the carriage forward in the direction of arrow 1 whenever the stop $i^4$ is disengaged from the rack $j^4$.

Whenever that one of the receiving type-cases P which is in line with the type-channel F becomes filled with types, the pressure of the types against the outer end of the carriage O causes said carriage, together with its supporting-frame Q, to move in the direction of arrow 2, Figs. 13 and 15, and by this motion the stop $i^4$ is gradually disengaged from the rack $j^4$, the weight $g^4$ is forced back beyond the fulcrum $d^4$ of its supporting-arm $f^4$, so that a stop, $n^4$, secured to the carriage O, is suddenly thrown in gear with the rack $o^4$, Fig. 13, while at the same time the stop $i^4$ becomes entirely disengaged from the rack $j^4$.

Figure 20:
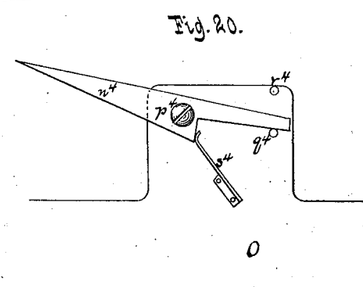

The stop $n^4$ is secured to the side of the carriage O, near its outer end, and in Fig. 20 an inverted plan of said stop is shown. It swings on a pivot, $p^4$, and its tail extends between two pins, $q^4$ $r^4$.

The spring $s^4$ has a tendency to retain said tail in contact with the pin $q^4$. By this arrangement the stop $n^4$ is adapted to yield, and after it has been thrown in gear with the rack $o^4$ the carriage O can follow the action of the weight $m^4$ until the tail of the stop $n^4$ strikes the pin $r^4$. By this motion of the carriage O the next receiving type-case is brought in line with the type-channel F. As soon as this motion has taken place the carriage O is moved back toward the type-channel F by the following means: To the swinging frame Q is pivoted a dog, $t^4$, (see Figs. 14 and 16,) from which projects a pin, $u^4$, into a slot, $v^4$, in a plate, $w^4$, which is firmly secured to the stationary frame R. When the carriage O and its supporting-frame Q are forced in the direction of arrow 2, by the pressure of the types the pin $u^4$ moves in the upper branch of the slot $v^4$ until it reaches the rear end of said upper branch, when it drops down, being impelled by a spring, $a^5$, Fig. 16, and thereby the dog $t^4$ is brought in the path of an oscillating lever, $b^5$, and by the action of this lever the carriage is moved toward the type-channel F, and at the same time the weight $g^4$ is carried back in the position shown in Fig. 14.

The lever $b^5$ has its fulcrum on a pivot, $c^5$, secured in the main frame R, and its lower end is connected to a bell-crank lever, $d^5$, to which a vibrating motion is imparted by the combined action of a cam, $e^5$, and spring $f^5$. The cam $e^5$ is mounted on the shaft $c^3$.

While the carriage is moved up toward the type-channel the pin $u^4$ of the dog $t^4$ passes through the lower branch and up the incline of the slot $v^4$ back to the position which it occupies in Figs. 14 and 16, and it is retained in this position by a spring-stop, $g^5$. By this motion of the pin $u^4$ the dog $t^4$ is raised so as to clear the oscillating lever $b^5$.

While the carriage O is moved toward the type-channel F, as above described, the stop $i^4$ engages with the rack $j^4$ before the stop $n^4$ has left the rack $o^4$, and the next of the receiving type-cases P is held up against the mouth of the type-channel F by the action of the weight $g^4$.

Figure 17:
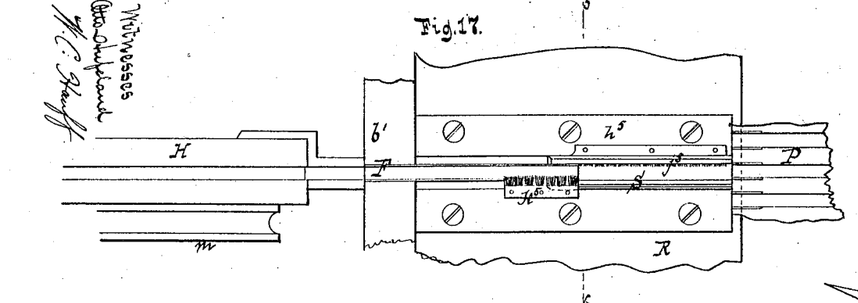
Figure 18:
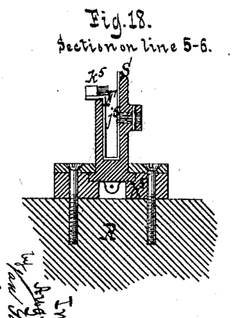
Figure 19:
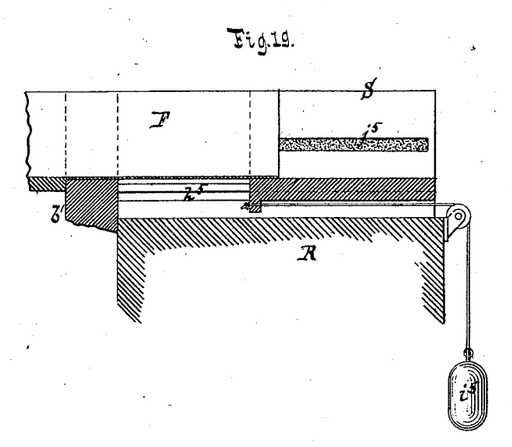

The mouth of the receiving type-channel F extends beyond the bracket $b^1$ (see Figs. 17 and 19) over the top of the stationary frame R, (see Fig. 13,) and it is provided with an extension, S, which slides in ways $h^5$, Fig. 18, and is exposed to the action of a weight, $i^5$, Fig. 19. When the carriage O, with the receiving type-cases P, is brought up against the mouth of the type-channel F, the extension S is pushed back, as shown in Fig. 13; but as the receiving type-case in line with the channel F begins to fill up and the carriage O is forced out in the direction of arrow 2, Fig. 13, by the pressure of the types the extension S follows the outward motion of the carriage, and the gap which otherwise would be produced between the channel F and the type-case in line therewith is filled up, so that the types received in the channel F are forced into the type-case through the extension S. As the carriage O is finally moved away from the type-channel F by the action of the weight $g^4$, Fig. 14, the types in the extension S are left unsupported, and in order to prevent them from tumbling over said extension is provided with a brush, $j^5$, as shown in Figs. 18 and 19. For the same reason a brush, $k^5$, is applied to the type-channel F near its mouth, one side of the extension and of the type-channel being partially cut away to make room for this brush, as shown in Figs. 17 and 18. At the moment the carriage is moved off from the mouth of the extension S the first type in this extension and the last type in the type-case are left without a support, and I propose to retain these types by suitable latches or spring-catches, or by brushes applied in the manner above stated. When all the type-cases in the carriage O have become filled, the type-cases are taken out and replaced by empty ones, and the operation of setting can proceed with very little interruption.

Figures 7, 9, 10, 11, 12:
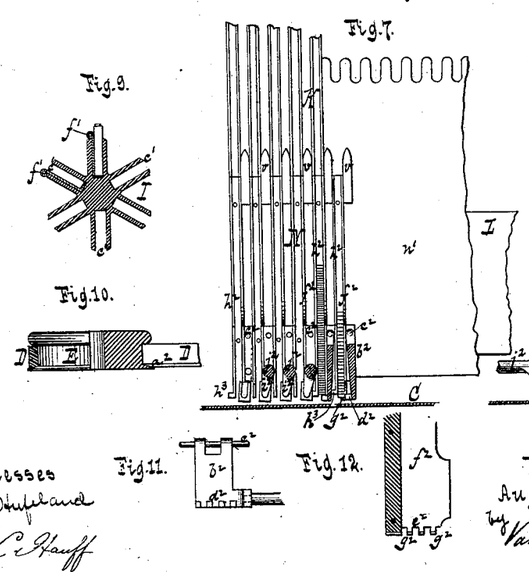
Fig. 7 is a front view of the supply type-cases, partly in section.
Figs. 9, 10, 11, and 12 are details which will be referred to as the description progresses.

Instead of using the carriage O with the receiving type-cases P, I can also use a revolving extension, I, which contains a series of radiating channels, $c^1$, Fig. 9, and which is provided with two gudgeons, $d^1$ $d^0$, one of which has its bearing in the bracket $b^1$ and the other in a bracket, $b^0$, Figs. 2 and 3, so arranged that by turning said extension on its gudgeons the radiating channels can be successively brought in line with the receiving type-channel F. A suitable spring-catch, $e^1$, retains the revolving extension in the required position. Each of the radiating channels $c^1$ is provided with an L-shaped lining, $f^1$; and if one of these channels becomes full the whole line of types contained therein can be lifted out by means of the L-shaped lining, said lining being held in a slightly-inclined position, so as to retain the types on it. Whenever one of the radiating channels $c^1$ becomes full, a hammer, $c^0$, hinged to the bracket $b^0$, Fig. 2, is tripped, and the gong $I^0$ is struck, and then the extension I is turned so as to bring the next radiating channel in line with the receiving type-channel F, and the types are taken out of the full channel $c^1$ by withdrawing the lining $f^1$, and these operations can be performed without stopping the machine.

I have here described this revolving extension, but I reserve the right to make the same the subject of a separate patent.

At the moment the carriage O is moved away from the mouth of the receiving type-channel F the types in this channel are left without a support; and in order to prevent them from tumbling over, a brush, J, Fig. 4, is applied, which bears against the types in the outer end of the channel F. The types in the channels $c^1$ are prevented from tumbling over by quoins or flat blocks of metal, which fit said channels, and which are pushed back, together with the line of types contained in each channel, by the action of the carriers $r$ on the conveyer H.

The roller B, which supports the apron C near the upper or front end of the frame A, has its bearings in boxes, which are adjustable by means of screws, Fig. 2, so that the apron can be kept taut in the direction of its length.

In the edges of the apron C are formed raised rims $g^1$, Fig. 1, by securing thereon narrow strips of leather or metal, or by any other suitable means, and these raised rims engage with rollers $h^1$, which are secured to the main frame A by adjustable brackets $i^1$, so that by means of said rims and rollers the apron can be stretched laterally, and that it can be readily held in the proper relation to the converging belts D D'.

The types to be set are contained in a series of supply type-cases, K, which are secured to an angular frame, L, composed of bottom rails, $k^1$, uprights $l^1$ $l^{1*}$, and top rails, $m^1$, and of two stair-shaped plates, $n^1$ $o^1$. The uprights $l^1$ are firmly secured to standards $p^1$, which rise from arms $q^1$, extending from the ends of the key-board M, and these arms are connected to the main frame A by pivots $r^1$, which have their bearings in lugs $s^1$, Figs. 1 and 2, so that by raising the key-board the angular frame L, together with the supply type-cases connected thereto, can be turned up away from the apron C, and that free access to the interior mechanism of the key-board and the mouths of the supply type-cases is obtained.

From the arms $q^1$ extend segmental bars $t^1$, which slide in holes in the platform of the frame A, and which are provided with heads $u^1$, forming stops for retaining the angular frame L in its raised position.

Figure 8:
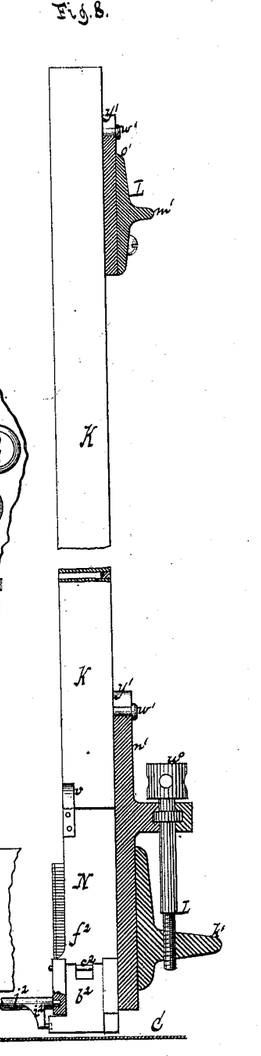
Fig. 8 is a sectional side view of the same.

The inner ends of the bottom rails, $k^1$, of the angular frame L are provided with set-screws $u^0$, which extend through lugs on the back of the stair-shaped plate $n^1$, and are tapped into ears projecting from the bottom rail. (See Fig. 8.) These set-screws serve to retain the stair-shaped plate and the type-cases in the required position.

The bottom ends of the supply type-cases K bear upon mouth-pieces N, which are firmly secured one to each of the steps of the stair-shaped plate $n^1$, (see Figs. 1 and 7,) and said type-cases are retained in position by spurs $v^1$, projecting from the sides of the mouth-pieces N, and by pins $w^1$, which project two from the back of each type-case and catch in recesses $y^1$, formed in the top edges of the plates $n^1$ $o^1$. (See Fig. 8.)

On the bottom of each mouth-piece is secured a latch, $b^2$, by a pivot, $c^2$, and on the bottom edge of said latch are formed a series of toes, $d^2$, Fig. 11, which, when the latch is closed, extend through slots $e^2$, Fig. 12, in one of the side plates, $f^2$, of the mouth-piece, and form the support for the column of types contained therein.

On the bottom edge of the side plate $f^2$ are formed lips $g^2$, which interlock with the toes $d^2$, and which are somewhat thinner than said toes, while the side plate $h^2$ extends down only to a level with the upper surface of these toes.

When the latch is drawn back the column of types in the type-case drops down upon the lips $g^2$, and when the latch is again closed up the lowest type in the column is pushed out by the toes $d^2$ beneath the edge of the side plate $h^2$ and it drops upon the apron C, which carries the same to the receiving type-channel, as already described. From the bottom edge of the side plate $h^2$ projects a lip, $h^3$, Fig. 7, to prevent the type while the same is being pushed out from turning.

The plates $n^1$ $o^1$ of the angular frame L are stair-shaped, so that all supply type-cases are parallel to each other, and at right angles to the axis of the rollers B B, which carry the apron C, and said plates are arranged at such an angle toward each other that each type, after having been discharged from one of the type-cases, has to travel the same distance, or nearly so, until it reaches the conveyer H, and that said types are deposited in the receiving type-channel in the order in which the same are discharged from their cases.

By referring to Fig. 1 it will be seen that the stair-shaped plates $n^1$ $o^1$ are set at right angles toward the converging belts D D', such position being, according to my experiments, the most favorable for the desired purpose.

Figure 5:
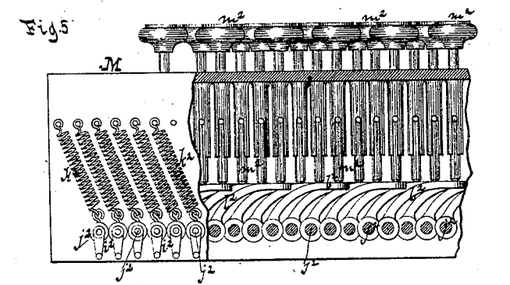
Fig. 5 is a vertical section of the key-board in the plane indicated by the line $x\,x$, Fig. 1, and looking in the direction opposite to that line.
Figure 6:
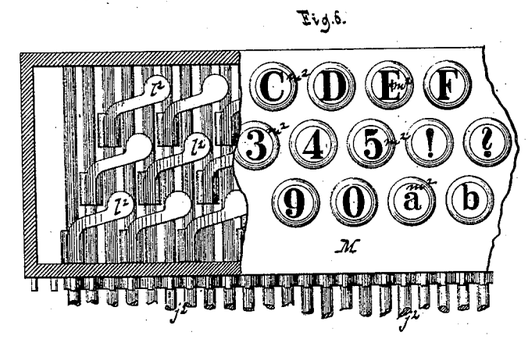
Fig. 6 is a plan or top view of the key-board, partly in section.

The latches $b^2$ are operated by cranks $i^2$, which are mounted on rock-shafts $j^2$, and the wrist-pins of which catch in sockets formed in the latches. (See Fig. 8.) The rock-shafts $j^2$ extend through the key-board M, and their inner ends have their bearings in sockets formed in lugs attached to the side plates $f^2$. They are exposed to the action of springs $k^2$, Fig. 5, which have a tendency to keep the latches $b^2$ closed. On each of the rock-shafts, in the interior of the key-board, is firmly secured a tappet, $l^2$, which bears against the inner end of one of the keys $m^2$. By depressing one of the keys, therefore, the appropriate rock-shaft is turned against the action of its spring, the latch on the corresponding type-case is opened, and the column of types in said type-case drops down on the lips $g^2$. When the key is released, the latch closes by the action of the spring $k^2$, and the lowest type in the case is discharged upon the apron C.

The means for imparting motion to the different working parts of my machine are as follows: On the driving shaft $n^2$ is mounted a pulley, $o^2$, which is driven by a belt from the line-shaft. The driving-shaft is geared by cog-wheels $p^2$ $q^2$ with a counter-shaft, $r^2$, situated above the apron C, Figs. 1, 2, and 3, and geared by bevel-wheels $s^2$ $t^2$, Fig. 3, with a vertical arbor, $u^2$, on which is mounted the pulley E' of the converging belt D'. The arbor $w^2$ is geared by cogs-wheels $v^2$ $w^2$ with the arbor $y^2$ of the pulley E', Fig. 4. The cog-wheels $p^2$ $q^2$ are so proportioned that the converging belts D D' move at a different speed from that of the apron C. On the driving-shaft is also mounted a pulley, $x^2$, which connects, by a belt, $z^2$, with a pulley, $b^3$, Fig. 2, mounted on a counter-shaft, $c^3$, from which motion is transmitted to the conveyer H by a belt, $q$.

I distinctly disclaim everything shown and described in my Patent No. 164,037.

What I claim as new, and desire to secure by Letters Patent, is—

1. In a machine for setting types, the combination, with converging guides, and with a carrying-apron, of rollers $h^1$, mounted in adjustable brackets $i^1$, and raised rims $g^1$, formed on the edges of the carrying-apron, substantially as and for the purpose set forth.

2. In a machine for setting types, the combination, with converging belts D D', and with a carrying-apron, C, of pulleys E E', provided with sharp-edged bottom flanges to engage with the beveled edges of the converging belts, substantially as and for the purpose described.

3. In a machine for setting types, the combination, with the carrying-apron C, and with the converging belts D D', of top rails, $a$, hinged arms $a^4$, and tightening-rollers $a^3$ $a^3$, all adapted to operate substantially as and for the purpose set forth.

4. The combination, in a type-setting machine, of a carrying-apron, C, a conveyer, H, a chute, G, and two converging belts, D D', one of which extends beyond the other, substantially as and for the purpose set forth.

5. The combination, in a type-setting machine, with a carrying-apron, C, converging belts D D', and conveyer H, of a hinged chute, G, and a spring for retaining said chute in contact with the apron by a yielding pressure, substantially as and for the purpose described.

6. The combination, in a type-setting machine, with a carrying-apron, C, converging belts D D', conveyer H, and chute G, of a spring-supported extension, $h$, hinged to one of the side plates of the chutes, and bearing against one of the belts D D' with a yielding pressure, substantially as and for the purpose set forth.

7. The combination, with the apron C, converging guides D D', and receiving type-channel F, of the stationary disk $l$, having cam-groove $p$, the rotary disk $m$, and carriers $r$, each pivoted at one end to said disk, and provided at its other end with a lateral projection which engages with the cam-groove in the stationary disk, substantially as described.

8. The combination, with the apron C, converging guides D D', receiving type-channels F, and carriers $r$ in the conveyer H, of a spring-supported roller, $u$, constructed and adapted to operate substantially as and for the purpose set forth.

9. The combination, with the receiving type-channel F, and with the carriage O, containing a series of receiving type-cases, of a swinging frame, Q, and a weight, $g^4$, constructed and adapted to operate substantially as and for the purpose described.

10. The combination, with the receiving type-channel F, carriage O, containing a series of receiving type-cases, and the frame Q, which supports the carriage O, of stops $i^4$ $n^4$ and racks $j^4$ $o^4$, constructed and adapted to operate substantially as and for the purpose set forth.

11. The combination, with the receiving type-channel F, carriage O, containing a series of receiving type-cases, and the frame Q, which supports the carriage O, of a cam, $e^5$, and mechanism for transmitting motion from said cam to the carriage, substantially as and for the purpose described.

12. The combination, with the receiving type-channel F and the carriage O, containing the receiving type-cases P, of an extension, S, fitting the mouth of the receiving type-channel, and adapted to slide thereon, substantially as and for the purpose set forth.

13. The combination, with the receiving type-channel F, the carriage O, containing the receiving type-cases P, and the extension S, of brushes for preventing the types from tumbling over, substantially as described.

14. The combination, with the apron C, the angular frame L, which supports the supply type-cases K, and the key-board M, of hinged arms $q^1$, for raising said type-cases and the key-board, substantially as set forth.

15. The combination, with the key-board M, with the carrying-apron C, and with the supply type-cases K, of stair-shaped plates $n^1$ $o^1$, forming parts of the angular frame L for retaining said type-cases parallel to each other and in line with the direction in which the apron C moves, substantially as described.

16. The combination, with the latches $b^2$ on the mouth-pieces N, of rock-shafts $j^2$, cranks $i^2$, springs $k^2$, tappets $l^2$, and keys $m^2$, substantially as and for the purpose set forth.

In testimony that I claim the foregoing I have hereunto set my hand this 21st day of June, 1878.

A. C. RICHARDS.

Witnesses:
W. HAUFF,
E. F. KASTENHUBER.